Nov. 19, 1957   F. G. R. WARREN ET AL   2,814,037
SCAN ANTENNA
Filed July 31, 1953   3 Sheets-Sheet 1

INVENTORS
FRANCIS G. R. WARREN
& STANLEY E. A. PINNELL
BY Milton S. Winters
ATTORNEY

INVENTORS
FRANCIS G.R. WARREN
& STANLEY E.A. PINNELL

ATTORNEY

:

United States Patent Office 2,814,037
Patented Nov. 19, 1957

2,814,037

SCAN ANTENNA

Francis G. R. Warren and Stanley E. A. Pinnell, Montreal, Quebec, Canada, assignors to RCA Victor Company, Ltd., a corporation of Canada Application July 31, 1953, Serial No. 371,509

Claims priority, application Canada July 11, 1953

24 Claims. (Cl. 343—754)

The present invention is related to antennas, and more particularly to scan antennas.

It is desirable in many applications, for example certain radar apparatus, to employ an antenna which may scan continuously throughout a circle, that is, over 360°. Moreover, it is often desirable to employ an antenna for the purpose which secures the scan action by rotation of one or a few parts, light compared to the weight of the entire antenna. In this way, the circle may be scanned rapidly. Even where a 360° scan may not be desired, but when only a sector of a circle is to be scanned, antennas providing scan action with the motion of a part light compared to the entire antenna are highly desirable in many applications.

As an example of an antenna which provides a 360° scan action with the motion of a relatively light part, reference may be made to U. S. Patent 2,576,182, to Wilkinson, Jr. This antenna has a pair of dielectrically separated metallic bodies having a variable spacing. The peripheries of the bodies are substantially on a circle. The separation between the bodies is variable to cause energy with its electric polarization normal to the axis of the peripheral circle, when incident along a radial line from the axis, to focus on the circle on the same radial line prolonged through the axis to the other side of the axis. Hence the action is similar to that of a Luneberg lens. This axis is the axis of the scan action. A waveguide or the like rotated around the axis along the peripheral circle may then provide an efficient and rapid scan action, whether for reception or radiation. However, this device is operable only for energy polarized with its electric vector normal to the axis. Otherwise, the velocity variation of waves in the antenna between the bodies does not provide the requisite focusing action.

Another device, with similar action for waves polarized with the electric vector parallel to the axis is disclosed in U. S. Patent 2,576,181 to Harley Iams. This Iams device employs a dielectric body of rotational symmetry with respect to the scan axis, having a variable thickness. Although this device operates well, a metallic structure is preferred for mechanical reasons, both for ease of construction and rigidity of structure. Further, in operation, a more perfect and definite focusing action is desirable than that readily provided by this Iams lens or antenna.

Investigations have been undertaken to provide a metallic antenna having its own circular periphery as the locus of foci for waves polarized with the electric vector parallel to the axis. It has been proved that such a device exists in the mathematical sense. The construction is based on the principle of equal velocity parallel plate radio wave optics. This principle calculates geodesics of an hypothetical surface which the waves are constrained to follow. The surface of constraint is the mean surface between a pair of parallel metallic surfaces. The waves are polarized with the electric vector normal to the surface. However, since the velocity of the waves is equal everywhere on the mean surface, this device may be designed either to be operable for waves polarized normal to the axis, or for waves polarized parallel to the axis. The mean surface or surface of constraint is calculated to cause the distances of travel to be equal for the waves to be brought to a focus. Reference may be made to the Journal of Applied Physics, volume 18, page 221, February 1947, by S. B. Myers, and the article in the same journal for September 1948, in which a parallel plate surface of revolution scanner is described by R. F. Rinehart. Although the Rinehart scanner is theoretically perfect, it has one serious disadvantage in that the hypothetical surface terminates in a lip having normals normal to the axis. The directions of flow for waves at its peripheral edge are at considerable angles to the plane containing the aperture and in which the scan action is desired. The radiation is not directed along radial lines in a plane normal to the axis as desired. Therefore, when a radiator or receptor scans the peripheral edge, poor radiation characteristics and high reflections result. The energy is not directed along a lip which includes radial lines in a plane normal to the axis, as desired.

Attempts to overcome the faults of this prior antenna by adding a toroidal lip to this unaltered form either:

(1) If the added lip is small (small radius of curvature) produce prohibitively high reflections; or (2) If the added lip has a larger radius of curvature to avoid reflections, the added lip adds an extra defocusing action to degenerate badly the radiation pattern.

The present invention overcomes this difficulty by allowing use of lip of sufficiently large radius of curvature to avoid the serious reflections, and compensating for the defocusing action of this lip by modification of the shape of the inner or dome portion.

The defect just mentioned is fatal to practical operation. Although a so-called lip may be placed on the mean surface, with corresponding lips on the parallel plates, of course, the result is not satisfactory. If the lip is made with a gentle curve to smoothly join the theoretically calculated surface, the focusing action is unsatisfactory, and the antenna pattern has objectionally great width. If the lip is made smaller, and with a greater curvature, to smoothly join the theoretically calculated surface, the reflections from the bend of the lips are too great to give satisfactory operation.

It is an object of the present invention to provide a novel scan antenna.

It is another object of the present invention to provide a scan antenna which satisfactorily scans for energy polarized with the electric vector parallel to or normal to the common antenna and scan axis (depending on which it is designed to do), but which especially satisfactorily scans for the former type of energy.

A further object of the invention is to provide a novel parallel plate antenna of the type described, that is, having the locus of the foci for waves incident along a line parallel to a radius of a circle lie along the same circle on the opposite side of the center thereof, at least within reasonable and practical limits.

A still further object of the invention is to provide a parallel antenna of the type described which may be employed for 360° rapid scan.

In accordance with one form of the invention, a pair of metallic bodies have a pair of dielectrically separated parallel surfaces. The mean surface between the metallic surfaces has an outer lip portion which is selected or predetermined, and preferably in the neighborhood of or between about one to two wavelengths measured radially from the axis. The remaining inner portion of the mean surface is calculated, in a manner to be more particularly described, to focus into parallel lines all energy which, radiating from a point at the periphery and along the plane, lies between tangents to the circle defining the inner edge of the lip portion. Conversely, this mean surface will focus all incoming parallel rays which strike the inner surface portion, at a focal point. The lip portion is selected so that the generator of the mean surface, as a curve rotated about the axis, has a slope or tangent normal to the axis at its outer extremity. Preferably, the outer portion is selected as substantially toroidal, for reasons more fully explained hereinafter. The tangent of the generator being normal to the axis assures that the scanner, when built, will direct energy in the desired manner to provide true scanning. A plurality of these antennas may be stacked coaxially if desired. Novel modifications permit feeding a single antenna (considered as a radiator) into a lip facing away from or toward the axis while the radiated energy is directed away from the axis. Such modifications disclosed herein are claimed in the separate application of co-inventor F. G. R. Warren, Serial No. 371,508, entitled Scan Antenna, and executed and filed concurrently with this application.

The foregoing and other objects, advantages, and novel features of the invention will be more fully apparent from the following description when taken in connection with the accompanying drawing, in which like reference characters refer to similar parts, and in which.

Figures 1, 2:
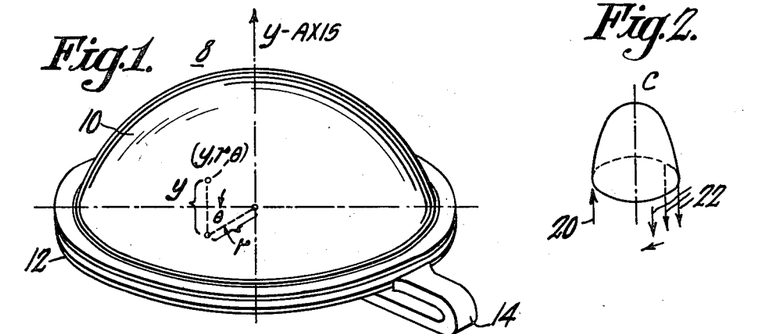
Fig. 1 is a perspective view of one embodiment of the invention which has a complete surface of revolution for the mean surface between the metallic bodies.
Fig. 2 is a schematic view of the prior art suggestion illustrating its principal defect.

The actual shape of the mean surface is found by applying the principle that the radiation flows along geodesics on the mean surface between the parallel plates. This surface must be so bulged in the center that all geodesic paths across the surface from any point on the circle of focal points to a straight line tangent to the circumference on the opposite side are equal in length. This straight line then is a phase front for the beam produced by a source of radiation at that point and the beam therefore consists of essentially parallel radiation. The aperture is a circular arc along the base of the surface opposite the feed point. Calculation of such a surface, as in the Journal of Applied Physics Article mentioned above, to focus all rays on the surface, results in a shape which is vertical at the circumference as illustrated in Fig. 2. This would require that the beam, in order to obtain scanning, be deviated sharply through a right angle into the horizontal plane. A sharp bend would introduce reflections and a high standing wave ratio. Addition of a slow bend to the surface already calculated introduces additional convergence which destroys the focussing conditions. By beginning the surface, however, with a lip horizontal at the outer circumference and curving sufficiently slowly, and by not requiring focussing of the extreme rays which stay within the lip only, an inner surface may be calculated which focusses perfectly all rays passing onto it from a point on the outer circumference of the lip. That is, the surface corrects for the focussing action of the lip. Incorporation of the lip into the solution provides a device improved over prior devices.

*Scan antenna with complete circular symmetry*

Figure 1A:
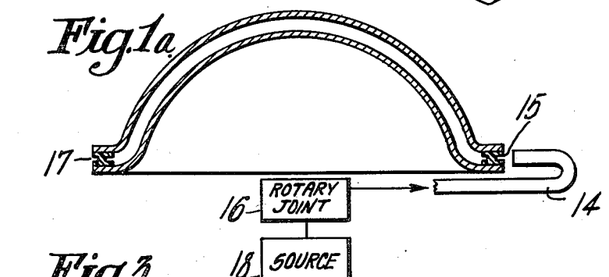
Fig. 1a is a cross sectional view taken in a plane through the axis of rotation of the generating curve mean surface of Fig. 1.

The method of scanning with the embodiment of the invention shown in Figs. 1 and 1a is to feed the radiation into the space between the conducting surfaces from a waveguide 14 (which may terminate in a horn) or other feed on the circumference or feed circle and move the feed around the circumference. For simplicity radiation scanning is considered here, but the fact that the reception pattern will be the same in scanning is known to the art. This feed revolves about the axis of symmetry of the antenna and is connected to the fixed components of the R.-F. (radio frequency) system, including a source 18, by means such as a rotary joint 16 on the axis of the system. Now a surface of revolution system for 360° presents the same contours no matter from what direction it is viewed on the feed circle. This means it has the same focussing properties no matter what the position of the feed on the feed circle and the characteristics of the beam do not change in any respect during the scanning process. In other words "off-axis" aberrations are completely absent because the beam is always effectively "on-axis." The antenna of Fig. 1 is a complete surface of revolution system. Modifications are possible which are only in part surface of revolution systems and which therefore lose their optical perfection at some point in the 360° scan. With such limited angle scanning systems, however, it is possible to retain effective axial symmetry over the portions of the surface covered by the radiation during the useful portion of the scan. Examples of these modifications with limited scan angles, however, are disclosed hereinafter, and are claimed in the separate application of co-inventor Francis G. R. Warren, executed and filed concurrently with this application, mentioned above.

Some important advantages of the scanner of Fig. 1 reside in the combination of high scanning speed potentialities with the absence of off-axis aberrations and the possibility of full 360° scan. No other scanner combines all these features. A rotating parabola is optically perfect in the same sense that this scanner is, but the large mass and wind resistance of a parabola make high speeds of rotation and hence high scanning speeds impossible. With the sscanner of Fig. 1, however, scanning is accomplished by revolution of the feed only, and as the feed may consist essentially of a light member, usually a waveguide, very high speeds of revolution are possible. Thirty revolutions per second is a reasonable rate for a model one meter in diameter. On the other hand, for a parabola of equivalent beam width, one rotation per second would probably be the upper limit of the speed of rotation. The shape of the present preferred embodiment lends itself well to mass production methods such as stamping or electroforming. An estimate of tolerances indicates that careful spinning produces satisfactory surfaces.

A number of other scanners having a stationary focussing system with a more or less light revolving primary feed are capable of scanning speeds as high as is this scanner but these are all limited in angle of scan and are all subject to a certain degree of off-axis aberration. The Foster scanner (see U. S. Patent 2,521,844) is probably the best all round performer among these other scanners.

Figures 5, 8, 10, 11:
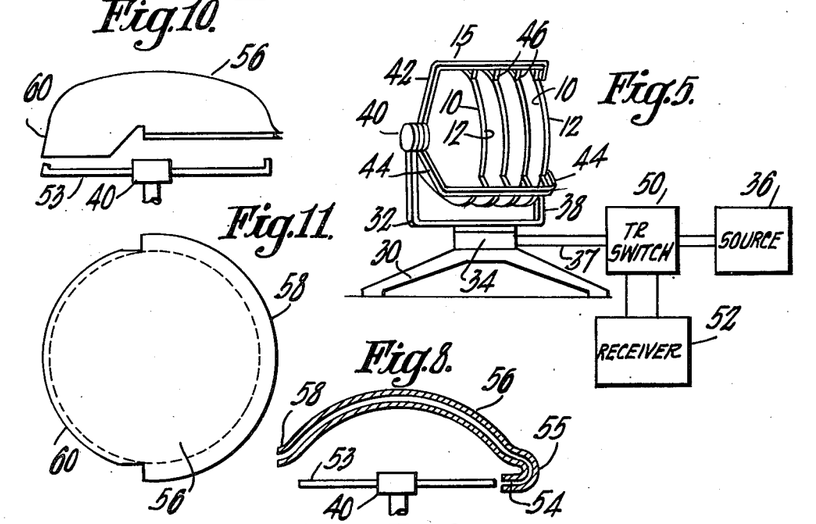
Fig. 5 is a perspective view of another embodiment of the invention using a plurality of antennas like that of Fig. 1, and arranged with feeds for sector scan, and with aligned axes for sharper pattern.
Figs. 8 and 9 are respectively a cross-sectional view in a plane including the axis and a bottom view of another embodiment of the invention especially suited for sector scan wherein an additional or extra lip faces the axis, whereby multiple feeds may be employed to feed this extra lip.
Figs. 10 and 11 are respectively side elevational and bottom views of another embodiment of the invention especially suited for sector scan in which an additional or extra lip faces parallel to the axis, and multiple feeds may be employed to feed this extra lip.

Even for limited angle or sector scanning applications, the present scanner has the advantage of high optical performance with scanning speed at least as high as any other type. One such sector scanning application would be the use of three feeds to the system spaced at 120° to one another and fed from a three-way rotary microwave switch giving a 120° sector scan (Fig. 5). The beam emerges between the two feeds which are not at the moment energized. The scanning repetition rate in this case is three times the rate of revolution of the feed system. The streamlined shape of the present scanner and the sheltered position of the feeds is of considerable advantage in applications where wind resistance is an important factor. The arrangement of Fig. 5 is described more fully hereinafter.

Figure 3:
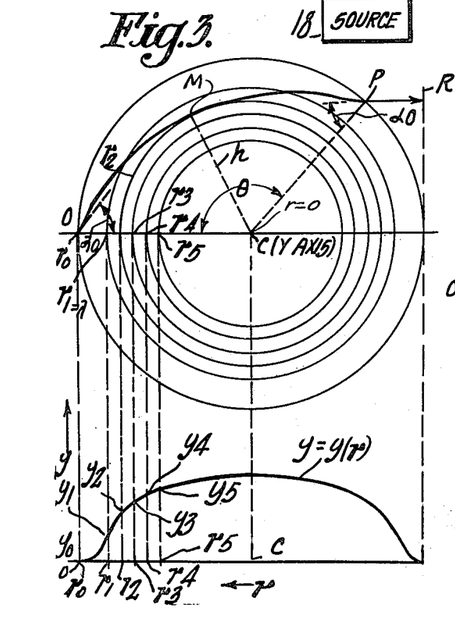
Fig. 3 is an explanatory geometric figure showing a view of the mean surface of the embodiment of Fig. 1 and a geodesic projected on a plane normal to the axis and also a view immediately below in a plane radial to the axis, shown together to aid in understanding the manner in which the generator of the mean surface for Fig. 1 is calculated.
Figure 4:
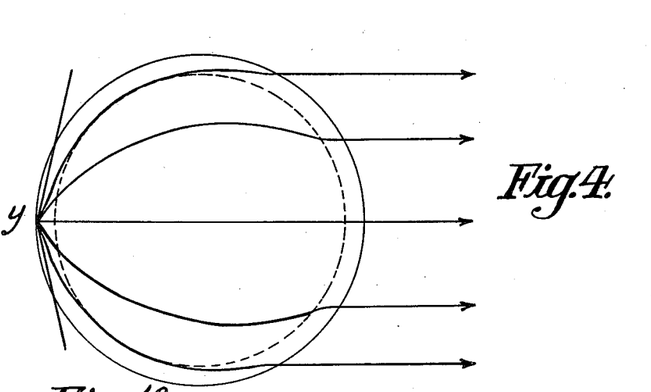
Fig. 4 is a view of the same mean surface projected on a plane normal to the axis illustrating the ray paths of energy flow.

The two conducting surfaces of revolution of the metallic bodies 10,12 (Figs. 1 and 1a) are so formed that when placed coaxially with and facing one another they are everywhere separated by the same perpendicular distance. These two surfaces and the space separating them form a parallel plate transmission system for microwaves. The order of magnitude of the space separating them is determined by the wavelength to be used. The guiding principle in deriving the shape of such surfaces is that microwaves are propagated between them along geodesics on the mean surface between the plates. The mean surface is the imaginary surface lying half-way between the actual surfaces measuring along their common normal. The condition for production of the narrowest (best collimated) beam is that the disturbance, after leaving the system, have a phase front which is a straight line perpendicular to the direction of propagation. This means that the optical distances from a source point on the circumference of the system to a straight line tangent to the circumference at the point diametrically opposite the source must be the same measured along the geodesic paths for all rays leaving the source point (see Fig. 3 or 4). In a sense, the result is a path length lens.

The approach used to calculate the shape of the desired mean surface for the device of Fig. 1 is to start with a curved lip chosen to satisfy the requirement for low reflections. The focussing properties of this lip are then taken into account in constructing the surface which is built up by a method of approximation which amounts to building up the surface as a series of conical slices, the slope of each cone being chosen to focus the ray leaving the source at a particular angle. A number of cones sufficient to give a smooth surface on construction is chosen. The lip must be kept as small as possible consistent with the requirements for low standing wave ratio, since those rays which travel only within the lip cannot be focussed. Fortunately, as these are the rays leaving the source at very large angles, their intensity, even from an unshaped waveguide feed, is sufficiently low to be negligible for reasonable lip sizes. If the feed termination is shaped, as in Fig. 1, the large angle rays are easily made negligible for any practical purpose.

Having obtained the proper shape of the mean surface, the shapes of the actual surfaces may be easily derived from the requirement that they are everywhere separated from the mean surface by a given perpendicular distance. For a system using the TEM mode, the plate separation may be anything less than half the wavelength to be employed. Generally, it will be as large as possible, that is near to a half wavelength, to increase the power handling capacity at the point of feeding.

It should be pointed out here that for a system to be used in the TEM mode, the shape of the mean surface to produce phase rectification is entirely independent of frequency or of scale. The only reason that the same shapes of the actual surfaces cannot be scaled directly for wavelengths differing by orders of magnitude or for widely differing overall dimensions at the same wavelength is that in general it would not be desirable to scale the plate spacing in the same ratio as the other dimensions. The shape of the mean surface itself can, however, be scaled directly and from this it is a simple matter to calculate actual surface shapes. Often, however, it might be desirable to recalculate the shape of the mean surface as direct scaling might product a lip larger or smaller than necessary because standing wave requirements would ask for a lip no larger on a large model than on a small model at the same wavelength.

Given an antenna which produces perfect phase rectification, the beamwidth is not a function of the particular antenna but rather of the size and shape of the aperture and the distribution of illumination along the aperture. The antenna of Fig. 1 differs from most other microwave antennas in that its aperture is an arc of a horizontal circle rather than a straight line. Theoretical predictions borne out by experimental results show that the pattern in a plane normal to the axis is essentially the same as that produced by a straight aperture of the length of the arc projected on a straight line perpendicular to the direction of propagation and having corresponding illumination.

Figure 6:
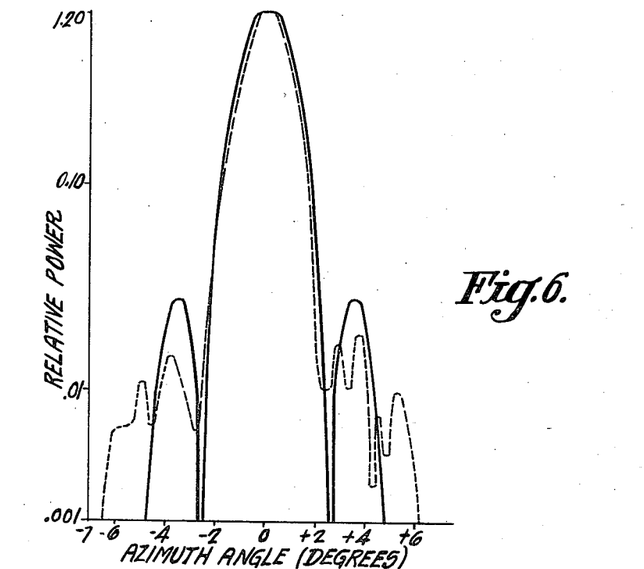
Figs. 6 and 7 are graphs showing antenna patterns of one embodiment of the invention.
Figure 7:
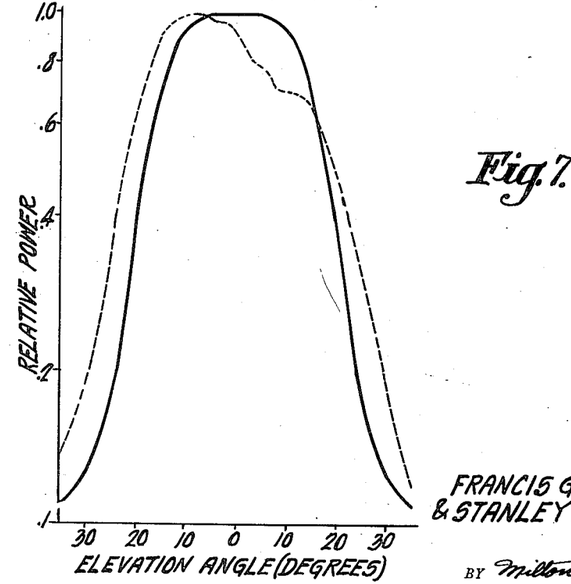

On the other hand, the vertical pattern of the circular arc aperture is considerably narrower than would be given by a straight aperture of the same height, that is, less than half a wavelength. This is due to the component of length of the aperture in the direction of propagation producing a type of end-fire effect in the vertical pattern. Calculated horizontal and vertical patterns at 0.86 cm. free-space wavelength for a 9.5 inch model of the antenna with 90% effective aperture assuming a $\cos^2 \alpha$ amplitude taper on the primary feed pattern are given in Figures 6 and 7 in solid lines with typical experimental patterns in dotted lines superimposed for comparison.

A major problem of any parallel plate system is that of maintaining the plate spacing within the required limitations without degrading the pattern. This requires that if spacers be placed in the path of the radiation in the system, they must not appreciably reflect or deflect the radiation incident on them or appreciably change its phase.

If the antenna is to be modified for limited angle scanning there are certain regions of the circumference through which no energy passes. It is possible to put spacers, of metal if so required, in these regions. The spacing problem in this case then is not difficult. If the 360° scanning feature is to be retained, however, all parts of the surface are from time to time illuminated so that spacers of some suitable type must be used. One approach is to use small discrete spacers (not shown) which necessarily disturb the phyical symmetry, (except in the case of a single centrally located spacer) and rely completely upon the perfection of their electrical design for "invisibility" to avoid disturbance of the pattern. As far as possible, the "invisibility" of the spacers should be maintained during the whole scanning cycle for all directions of incidence of the radiation. Several types of "non-reflecting" spacers have been designed by various workers in the field of parallel plate optics. For example, such a spacer is disclosed in U. S. Patent 2,528,367 to Iams.

An annular ring 15 of dielectric, as shown in Fig. 1a, may be employed as a spacer. This ring may be made of any suitable dielectric, for example, plexiglass or styro foam, but preferably having near unity index of refraction. The radial thickness of the ring is selected at one quarter wavelength (in the dielectric), to reduce reflections. The annular ring introduces an aberration, although a small one. As shown hereinafter, however, account may be taken in the mean surface to reduce this aberration. Reflections may be further reduced by an annular slot, such as 17, in the outer edge of the annular spacer 15, or a slot in both outer and inner edges as shown.

It may be noted here that the antenna of Fig. 1 has an advantage in low wind loading due to the rather streamline shape and the low power requirements in spinning the relatively light feed systems. Moreover, the bandwidth of the antenna for polarization (always referring to the electric vector) parallel to the axis is both in theory and in practice exceedingly broadbanded.

*Plurality of coaxial scan antennas (Fig. 5)*

In Fig. 5 is shown another embodiment of the invention which employs a plurality of antennas 8 of the type shown in Fig. 1, but each having a plurality of feeds and arranged coaxially with each other. The arrangement of scanners is supported by a base 30. The mechanical support includes a waveguide arm 32 supplied through a rotatable joint 34 with energy from any suitable source 36 as through a waveguide 37. The waveguide 32 may be the mechanical support or arm, from the base, to support the structure at one axial end. The other axial end is held by an arm 38. The waveguide arm 32 terminates at a rotating joint and switch 40, of any suitable known form, which distributes the energy from arm 32 selectively to three feed waveguides only two of which, 42 and 44, are visible. Each of the feed waveguide arms as 42, 44 receives energy only when it occupies the lowest 120° sector of its total rotation. Each feed waveguide has small antenna elements, such as branch waveguides or horns, 46, which may be like that terminating waveguide 14 of Fig. 1. Each of horns 46 is suitably coupled to the feed arm carrying it and each is associated with one of the antennas. Each of the horns 46 abstracts a portion of the energy from its feed arm. Each feed arm as 42, 44 may be terminated by energy absorptive means (not shown because such means are well known) at their end portions remote from the joint and switch 40. The horns 46 and the antennas 8 are separated axially by a wavelength in the feed waveguide to which it is coupled so that each horn 46 is fed in phase with any other coupled to the same feed waveguide arm. Separation may also be other distances provided known means are employed to keep such in-phase relationship. If the beam is to slant, and a conical section swept by the axis of the antenna pattern, a different phase relation may be employed.

In operation, consider first a single one of the antennas 8, and its multiple feed horns 46. As the feed arm carrying each horn reaches the lowest 120° sector, the horn feeds the antenna 8. As rotation of the arm and the horn 46 carried by it continues, the emergent energy sweeps a sector of 120°. It will be understood that in practice the sector must be somewhat less to allow for switching. As the next feed arm assumes the lowest 120° sector, the same sector is swept again. If the rate of rotation is constant, the sector is swept successively over the upper 120° sector, each time at a constant angular velocity. Thus the repetition and sweep rate may be made very high. The orientation shown makes for a substantially hemispheric search pattern, although other orientations may be employed, for example with the axis vertical for horizontal sector scan. If it is desired to have a radiation pattern narrow in a plane including the common axis of the antenna, in the device as shown in Fig. 5, then a plurality of antennas is employed in the arrangement shown. Also, by rotation about the axis normal to the common axis of antennas 8 and by rotation of the first rotatable joint 34 the plane in which the sweep occurs may be turned at will about the vertical axis of rotation of this first joint 34. Of course, the reception pattern of the arrangement is the same as the radiation pattern.

There may be included, as in typical radar (radio echo detection and ranging) apparatus, the usual TR switch 50 and receiver 52, with source 36 as a pulse source. Then the reception and radiation patterns are both employed to advantage. The source 36, TR switch 50, and receiver 52 may also be used in Fig. 1, to replace the source 18, and the waveguide 37 may then lead to the rotating joint 16 in a manner which will be readily understood by those skilled in the art.

*Computation of mean surface (Figs 3 and 3A)*

Figure 3A:
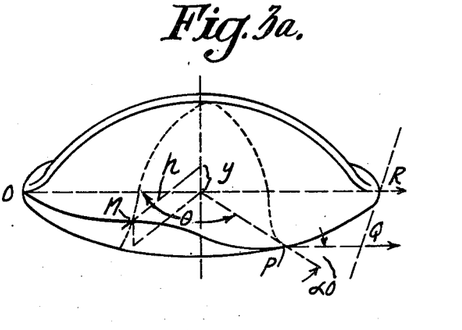
Fig. 3a is a geometrical figure illustrating the meaning of mathematical symbols employed in calculating the desired mean surface.

In order to show how to compute the desired geodesic surface to construct the antenna of Fig. 1, consider a surface of revolution obtained by revolving a curve $y=y(r)$ about the y-axis, as in Fig. 3A. Through any point $(r_1, \theta_1, y(r_1))$ expressed in cylindrical coordinates there exists in any direction a unique geodesic which satisfies an equation of the form $$\sin \alpha = h/r \quad (1)$$

where $\alpha$ is the angle at which the geodesic cuts the meridian plane (the plane including the y-axis) at the point and $h$ is a parameter which characterizes the particular geodesic. The meridian plane includes the axis of revolution (y-axis) and also the point $(r_1, \theta_1, y(r_1))$. The Formula 1 is easily derived. It is due to Clairaut and is known in differential geometry. The parameter $h$ is the distance of closest approach of the particular ray to the y axis.

The geodesic distance to another point $(r_2, \theta_2, y(r_2))$ is given by $$s = \int_{r_1}^{r_2} \left| \frac{(1+y'^2)^{1/2}}{(r^2-h^2)^{1/2}} r \, dr \right| \quad (2)$$

where $y' = dy/dr$. The total change in polar angle along the geodesic is $$\theta_1 - \theta_2 = h \int_{r_1}^{r_2} \left| \frac{(1+y'^2)^{1/2}}{r(r^2-h^2)^{1/2}} \, dr \right| \quad (3)$$

The geodesic distance given by (2) is the minimal path between the two points, that is, the path that a frictionless string stretched between them would take up if constrained to lie everywhere in the surface, or the path of least time of travel. The assumption of the propagation of electromagnetic waves along geodesics in the parallel plate equal velocity structures is a natural consequence of Fermat's principle in optics.

If, on the geodesics through a focus, points are taken at equal geodesic distances from it, the focus of the points is an orthogonal trajectory of the geodesics. This is equivalent optically to saying that the wavefronts are normal to the direction of propagation, so that in the case of a plane parallel beam they become straight lines. It can be shown that where a geodesic crosses a sharp bend it makes the same angle with the bend on both sides of it.

The form visualized for the mean surface of the surface of revolution lens or antenna 8 is shown in Fig. 3A. A projection on a plane normal to the axis, Fig. 3, aids in understanding the geometry. Rays from the focus at O pass over the surface traveling along geodesic paths. The shape of the surface is required to be such that the rays emerge as a parallel beam in the plane of the base circle.

Consider a general ray as shown in Fig. 3, which leaves O making an angle $\alpha_0$ with the meridian given by:

$$\alpha_0 = \sin^{-1} \frac{h}{r_0} = \sin^{-1} h \quad (4)$$

$r_0$ may be taken as unity, without loss of generality. This ray cuts the meridian at right angles at some point M which is at the minimum distance $h$ from the central axis. This ray makes the same angle $\alpha_0$ with a meridian plane at the aperture circle, $r=r_0$ at either the point where it enters or the point where it leaves. As $y'(r)=0$ at $r=r_0$, a radial line through the point of entrance O or of emergence P also meets the ray at the angle $\alpha_0$. Thus, the condition that the general ray should be parallel to the central ray (in the plane of the base circle) is that for $\theta$ at the point P of emergence.

$$\theta=\pi-\alpha_0 \qquad (5)$$

The value of $\theta$ may be obtained from Equation 3, bearing in mind that $r$ is decreasing along the geodesic from O to M and increasing from M to P so that Equation 5 may be written $$h\left|\int_0^M \frac{(1+y'^2)^{1/2}}{r(r^2-h^2)^{1/2}}dr\right|+h\left|\int_M^P \frac{(1+y'^2)^{1/2}}{r(r^2-h^2)^{1/2}}dr\right|=\pi-\sin^{-1}h \qquad (6)$$

taking $r_0$ as unity.
Or:

$$2h\left|\int_h^1 \frac{(1+y'^2)^{1/2}}{r(r^2-h^2)^{1/2}}dr\right|=\pi-\sin^{-1}h \qquad (7)$$

This condition may be reformulated in terms of path length of the rays. Parallelism of the emergent beam requires emergent wavefronts which are straight lines normal to the direction of propagation. In other words, referring again to Figs. 3 and 3A, the focussing requirement is that the geodesic length OMP out to the tangent through R be independent of $h$. That is:

$$2\int_h^1 \frac{(1+y'^2)^{1/2}}{(r^2-h^2)^{1/2}}r\,dr+(1-\cos\alpha_0)=K \qquad (8)$$

It may be shown that the generating curve under these conditions, and therefore the generated surface has a tangent, normal to the axis at $r=0$, i. e. $y'=0$ at $r=0$. This means that the surface does not come to a point or cusp, which point or cusp would cause poor electrical characteristics for the antenna.

From the electrical point of view, what is required is a surface with a horizontal lip curving upwards to join the central cap, the curvature everywhere being small enough to conform to good waveguide practice. Although such a surface cannot focus all rays over it from a point on the feed circle, a surface focussing all rays for which $h/r$ is less than some fraction $\lambda$ (an arbitrary value not to be confused with wavelength) which is only slightly less than unity is quite satisfactory in focussing action. The effective aperture of such a system would be $2\lambda r_0$ which would result in a slight increase of feed circle to aperture ratio; its performance as far as focusing alone is concerned; is substantially as good as that of the ideal solution, provided $\lambda$ is near unity, but there is a great improvement in other performance aspects. The generating curve $y(r)$ may be taken equal to $f_1(r)$ in the interval between 1 and $\lambda$ and equal to $f_2(r)$ for $r$ less than $\lambda$. It may be noted here that for a horn presenting a point source at a point removed farther from the antenna axis than the radius of the periphery, the generating curve may be taken as a straight line between the apparent source and the real peripheral radius.

There exist an infinite number of such surfaces. It is desired to establish a relation connecting the shape of the central surface with that of the predetermined outer lip. To do this, consider the solution surface in two sections, as already suggested, an outer lip extending inwards from $r=1$ to $r=\lambda$, and an inner surface extending from $r=\lambda$ to $r=0$. Suppose that for the lip the arc length of the generator is given by $$ds_1=(1+y'^2)^{1/2}dr=f_1(r)dr \qquad (9)$$

and for the inner surface by $$ds_2=(1+y'^2)^{1/2}dr=f_2(r)dr \qquad (10)$$

Then from (7) it is desired that:

$$2\int_\lambda^1 \frac{hf_1(r)dr}{r(r^2-h^2)^{1/2}}+2\int_h^\lambda \frac{hf_2(r)dr}{r(r^2-h^2)^{1/2}}=\frac{\pi}{2}+\cos^{-1}h \qquad (11)$$

for all values of $h$ between $h=0$ and $h=\lambda$. This can be simplified somewhat by defining $\phi_1(r)$ and $\phi_2(r)$ such that $$\left.\begin{array}{l}f_1(r)=\frac{1}{2}\{1+\phi_1(r)\}\\f_2(r)=\frac{1}{2}\{1+\phi_2(r)\}\end{array}\right\} \qquad (12)$$

Substituting, we get:

$$\int_\lambda^1 \frac{h\phi_1(r)dr}{r(r^2-h^2)^{1/2}}+\int_h^\lambda \frac{h\phi_2(r)dr}{r(r^2-h^2)^{1/2}}+\int_h^1 \frac{hdr}{r(r^2-h^2)^{1/2}}=\frac{\pi}{2}+\cos^{-1}h \qquad (13)$$

which reduces to $$\int_\lambda^1 \frac{h\phi_1(r)dr}{r(r^2-h^2)^{1/2}}+\int_h^\lambda \frac{h\phi_2(r)dr}{r(r^2-h^2)^{1/2}}=\frac{\pi}{2} \qquad (14)$$

Now introduce $\Omega(r)$ such that $$d\Omega(r)=\frac{\phi_2(r)dr}{r} \qquad (15)$$

and re-arrange so that we have $$\int_\lambda^1 \frac{h\phi_1(r)dr}{r(r^2-h^2)^{1/2}}-\frac{\pi}{2}=-h\int_h^\lambda \frac{d\Omega(r)}{(r^2-h^2)^{1/2}} \qquad (16)$$

This is an integral equation of the general form $$g(h)=-h\int_h^\lambda \frac{d\Omega(r)}{(r^2-h^2)^{1/2}},\quad 0\leq h\leq\lambda \qquad (17)$$

which may be shown (R. K. Luneberg, Mathematical Theory of Optics, Brown University, Providence, R. I.—mimeographed, 1948, p. 211) to have as solution $$\Omega(r)-\Omega(\lambda)=\frac{2}{\pi}\int_r^\lambda \frac{g(h)dh}{(h^2-r^2)^{1/2}} \qquad (18)$$

Applying this inversion theorem to (16), the solution is $$\Omega(r)-\Omega(\lambda)=\frac{2}{\pi}\int_r^\lambda \frac{\left[\int_r^1 \frac{h\phi_1(r)dr}{(r^2-h^2)^{1/2}}-\frac{\pi}{2}\right]dh}{(h^2-r^2)^{1/2}} \qquad (19)$$

Differentiating this expression gives $d\Omega(r)$ so that $\phi_2(r)$ is implicitly determined once $\phi_1(r)$ is known. That is, for every outer lip there exists an inner surface which will focus all rays which pass to it from the outer point, although there is nothing to indicate that the solution represents a real surface. In order that it be real some restriction must be placed on the function $\phi_1(r)$. One condition, at least, that it must fulfill is that $$\int_\lambda^1 \frac{\lambda\phi_1(r)dr}{r(r^2-\lambda^2)^{1/2}}=\frac{\pi}{2} \qquad (20)$$

if the slope of the generator is to be continuous at $r=\lambda$. This can be seen from (16) by letting $h$ approach $\lambda$.

While Equation 19 represents a solution, it is of little value for the required integrations are extremely difficult, if not impossible, for suitable assumed forms of $\phi_1$. Furthermore, the usual methods of approximation are of little use here, since both the inner and outer integrals may be unbounded at one limit of integration. As a result, it is ordinarily better to deal with Equation 11 directly and to use some means of approximating the desired curve. One convenient manner of procedure follows.

The general character, although not the exact form, of the lip is fixed by the curvature requirements of avoiding reflections and high standing wave ratio in bringing the radiation into a horizontal plane. The generator of the lip must be horizontal at the outside radius, the focussing condition must be met for the ray having $h$ equal to the inner radius of the lip and at no point in between must the curvature exceed that allowed by good waveguide technique. A further consideration is that the functional form of the generator be such as to give an integrable form for the geodesic angle and length integrals, to avoid the labor of extended computation.

Within the inner boundary of the lip, in order to focus all rays which pass over the central surface from the lip, the central surface must have a generator for which $ds=f_2(r)dr$, such that the condition of Equation 11 is met. Then for a suitable lip resort may be had to methods of approximation to find $f_2(r)$. Building up the generator progressively in linear segments proved the most satisfactory procedure and was the method used in the derivation of the surface used in an actual antenna built and satisfactorily operated.

Linear segments were used in the building up of the generator curve rather than curved segments as trials showed that equivalent accuracy in meeting the focussing requirements could be obtained with much less work. Intuitive reasoning suggests that a toroid would be the most suitable form of lip since the curvature is constant and the lip can be made as small as possible without exceeding curvature requirements. The polar angle $\theta$ traced out by a ray in traversing the toroidal lip may be evaluated by approximate means or by exact means. However, the usual approximations give inaccurate results for those rays for which $\theta$ is close to $$\frac{\pi}{2}$$

In the present example, an approximately toroidal lip for which the exact angular integral could be obtained, was employed, because the exact integral for the toroid was found only after the computations were completed. The form of generating curve adopted for the lip is given by $$f_1(r)=(1+y'^2)^{1/2}=1+\tfrac{1}{2}\left(\frac{x}{c}\right)^2+\tfrac{3}{8}\left(\frac{x}{c}\right)^4 \qquad (21)$$

where $c$ is a constant and $x=r_0-r$.

It is seen that this expression is obtained from binomial expansion of the corresponding expression $$f(r)=(1+y'^2)^{1/2}=\left(1-\left(\frac{x}{c}\right)^2\right)^{-1/2} \qquad (22)$$

for the exact toroidal lip, the series being terminated at the third term. The curvature of this generator has a maximum value of $$\frac{1}{c} \text{ at } r=r_0$$

and falls off gradually for $r<r_0$. Further terms in the binomial expansion would give a closer approximation to a circular generator, but the labor involved in subsequent calculations becomes prohibitive.

To ensure maximum aperture to feed circle ratio the constant should be chosen so that the valve of $$\frac{1}{c}$$

is at the maximum permitted by good waveguide practice. The lip is then completely determined when its inner radius $\lambda r_0$ is specified. This is done by requiring that the ray for which $h$ equals $\lambda r_0$ be focussed by the lip, i. e.

$$\theta=\frac{\pi}{2}+\cos^{-1}\lambda, \text{ for } h=\lambda r_0 \qquad (23)$$

In the actual device, $r_0$ was fixed at 4.75 inches, the largest radius that could be swung on a precision lathe available, to give the largest possible aperture, and the wavelength was chosen as 0.86 cm. Following this procedure for $c$ of the order of one wavelength gave a value of $\lambda$ in the vicinity of .9. It was then decided to fix $\lambda$ at 0.90 and adjust $c$ to focus the ray for which $h=\lambda r_0$.

For convenience the calculations were made on the basis of unit radius and the results scaled to an outer radius of 4.75 inches. This is permissible as the focussing properties are independent of scale, and in the following discussion we will take $r_0=1$. For the purpose of this model then, the unit of measurement was 4.75 inches.

Having determined the form of $f_1(r)$ for the lip, the expression for the polar angle traced out by a ray in traversing the lip, $$\theta=\int_\lambda^1 \frac{hf_1(r)dr}{r(r^2-h^2)^{1/2}} \qquad (24)$$

was integrated and the resultant function evaluated for all values of $h$ desired, that is for every value of $h$ for which the focussing condition was to be applied in subsequent calculations for the central surface. These calculations were rather complex and had to be carried out to eight significant figures to achieve four figure accuracy in the final result. As a rough check, the values of $$\frac{\Delta\theta}{\Delta h}$$

were plotted on large scale graph paper, deviations from a smooth curve indicating an error in the calculations which could then be corrected.

These values of $\theta_h$ were then used in determining the shape of the central surface by the methods described hereinafter.

As the form of $y=f(r)$ for the lip could not be readily derived from $$(1+y'^2)^{1/2}=f_1(r) \qquad (25)$$

by integration with this form of $f_1(r)$, mechanical integration using the planimeter was employed.

In the region $r \angle \lambda$, the surface should be so shaped that all rays which pass over it are brought to a focus. The required generating curve can be approximated in a number of ways. The second integral of Equation 11 should be evaluated exactly, if possible (as indicated in this example), to avoid errors in approximate integration. Another factor is that in most of the numerical work the final value of $\theta$ is a result of cancellations of relatively large values, so that eight and sometimes nine significant figures should be carried to achieve sufficient accuracy. The method of approximation described was selected because it allowed the second integral of Equation 15 to be evaluated exactly and seemed to give the highest accuracy for a given expenditure of time in calculation.

Satisfactory results are obtained by approximating the required curve with a number of separate segments, and by sufficiently restricting the range of each segment. One good method is to construct the curve as a polygonal arc using a large number of straight segments, the slopes of these segments being adjusted so as to focus those rays which just touch the circles generated by the ends of the segments. This was done by determining first the slope of the outer interval and working toward the axis, step by step. Fitting for $h$ at the end point of the segment turns out to be satisfactory and simpler than some other possible methods.

The intervals were made sufficiently small that the straight segments departed from a smooth curve drawn through their end points by less than one mil which was better than the accuracy anticipated in machining. This was checked from the first two segments calculated, since in this section the curvature of the generator was found to be the greatest. For our model, the range from $.9 \geq r \geq .85$ was divided into 10 equal intervals, while the range from $.85 \geq r \geq .8$ was divided into 5 equal intervals.

Suppose these intervals are labelled in sequence $I_1$, $I_2 \ldots I_{15}$, starting with the outer interval. Since the slope $y'$ is constant along each segment, constants $k_1$, $k_2$, $k_3$ ... $k_{15}$ can be assigned to the values of $(1+y'^2)^{1/2}$ in the corresponding intervals. To determine $k_1$, the requirement is that the ray for which $h=.895$ should be focussed.

Hence from Equation 5 we require:

$$2\int_1^{.895} \frac{.895\,(1+y'^2)^{1/2}dr}{r(r^2-.895^2)^{1/2}} = \frac{\pi}{2}+\cos^{-1}.895 \qquad (26)$$

The integral can be split up into two sections, that over the lip where $1 \geq r \geq .9$, and the other over the interval $I_1$ where $$(1+y'^2)^{1/2}=k_1 \qquad (27)$$

The former is $\theta_{.895}$ (the value of $\theta$ in the lip for $h=0.895$) which was previously calculated. Thus, we have:

$$2\int_{.895}^{.9} \frac{.895\,k_1 dr}{r(r^2-.895^2)^{1/2}} = \frac{\pi}{2}-\cos^{-1}.895 - \theta_{.895} \qquad (28)$$

or $$2k_1 \cos^{-1}\left(\frac{.895}{.9}\right) = \frac{\pi}{2}+\cos^{-1}.895 - \theta_{.895} \qquad (29)$$

which determines $k_1$.

In the interval $I_2$ where $(1+y'^2)^{1/2}=k_2$, the ray for which $h=.89$ should be focussed, that is:

$$2\int_{.895}^{.9}\frac{.89\,k_1 dr}{r\{r^2-(.89)^2\}^{1/2}} + 2\int_{.89}^{.895}\frac{.89\,k_2 dr}{r\{r^2-(.89)^2\}^{1/2}} =$$

$$\frac{\pi}{2}+\cos^{-1}.89 - \theta_{.89} \qquad (30)$$

or $$2k_2 \cos^{-1}\frac{.89}{.895} = \frac{\pi}{2}+\cos^{-1}.89 - \theta_{.89} -$$
$$2k_1\left[\cos^{-1}\frac{.89}{.9}-\cos^{-1}\frac{.89}{.895}\right] \qquad (31)$$

which fixes the value of $k_2$ since $k_1$ is already known.

Continuing this process for each value of $h$ down to $h=.8$, all the $k$'s were determined. From these, the value of $y'$ $$\left(\text{that is, } \frac{dy}{dr}\right)$$

in each segment was calculated and the curve constructed over this range. As the $k$'s were calculated, they were plotted against $h$. The fact that this gave a smooth curve served as a rough check of the calculations, since the previous values could be extrapolated to give an approximate result for the next segment.

This method of approximating the generating curve could be extended to cover the whole central region, but the number of segments would be rather large and the calculations would become progressively more laborious. Fortunately, any one of a large number of functions could be adjusted to satisfy by approximation the focussing condition over fairly extensive ranges in the section corresponding to $r \leq .8$. The most successful of these was of the form $$f_2(r) = (1+y'^2)^{1/2} = \frac{1}{2}\left[1+\left\{1-\left(\frac{r}{C}\right)^2\right\}^{-1/2}\right] \qquad (32)$$

where $C$ is an adjustable constant. It will be seen that this is half the sum of the functions giving $(1+y'^2)^{1/2}$ for a plane and for a sphere of radius $C$. This takes advantage of the known general similarity of this shape to that which is required.

The value of $C$ was fixed by requiring that the central ray should have a length to the point diametrically opposite the focus equal to the length along the ray $h=9$ out to the tangent at this point. This gave a function which was close enough to the required generator that it was used to span the whole range $0 \leq h \leq .8$ with excellent accuracy everywhere except in the small interval $.79 \leq h \leq .8$, and even here the accuracy was acceptable.

Summarizing then, the generating curve for the mean surface of this model was built up as follows: an approximately circular arc extending from $r=1$ to $r=.9$ as the lip, then a transitional interval of straight segments from $.9 \geq r \geq .8$, and finally a smooth curve for the range $.8 \geq r \geq 0$.

The path lengths over the geodesics were then checked. The approximations were found to be good. Over the whole aperture, the path lengths were constant within $\frac{1}{32}$ wavelength or less except in the very narrow range at $h=.79$ where the maximum error was $\frac{1}{8}$ wavelength (for $r_0=4.75$ inches and a wavelength of 0.86 cm.).

The values of $y(r)$ to four significant figures, for the fifteen intervals between $r=.9$ to $r=.8$ mentioned above are tabulated below. $y'(r)$ is constant within any interval, although the integrated form $y(r)$ is not constant. In tabulating $y(r)$, its value is given for the inner end of the interval, i. e., the smallest value of $r$ in the interval, and additionally the value of $y(r)$ at the largest value of $r$ in the interval $I_1$ is given.

For the interval $.9 \geq r \geq .80$ ($I_1$ to $I_{15}$)

| Interval | $y(r)$ | at $r$ equals |
|---|---|---|
| $I_1$ | 0.1184 | [1] 0.900 |
| $I_1$ | 0.1318 | [2] 0.895 |
| $I_2$ | 0.1434 | 0.890 |
| $I_3$ | 0.1540 | 0.885 |
| $I_4$ | 0.1637 | 0.880 |
| $I_5$ | 0.1729 | 0.875 |
| $I_6$ | 0.1815 | 0.870 |
| $I_7$ | 0.1898 | 0.865 |
| $I_8$ | 0.1977 | 0.860 |
| $I_9$ | 0.2053 | 0.855 |
| $I_{10}$ | 0.2125 | 0.850 |
| $I_{11}$ | 0.2262 | 0.840 |
| $I_{12}$ | 0.2392 | 0.830 |
| $I_{13}$ | 0.2515 | 0.820 |
| $I_{14}$ | 0.2632 | 0.810 |
| $I_{15}$ | 0.2743 | 0.800 |

[1] Largest value of $r$ in $I_1$.
[2] Least value of $r$ in $I_1$.

$y(r)$ for the outer interval between $r=1$ and $r=0.9$ is readily calculated from $y=f_1(r)$, and for the central region for $r$ less than 0.9 the value of $y(r)$ is given by the approximation for that interval already described.

The curve thus obtained is to be the mean between two generating curves (generating the desired metallic surfaces) whose normal separation, or distance apart measured normally to the curves, is constant; and preferably less than a half wavelength, in order to insure that only the dominant mode is propagated between the parallel plates. For operation at 0.86 cm. (about .34 inch) free space operating wavelength, a separation of 4 mm. was selected.

The generating curves for the metallic surfaces may now be obtained. The radius $r_0$ was selected to be 4.75 in., the curve is plotted up on a 16:1 scale, with $r_0=76$ in. A great number of circles of 32 mm. radius are marked with their centers at close intervals on the curve. The upper and lower envelopes of these circles give the generating curves for the metallic surfaces of which the curve is the median on a 16:1 scale. The envelope curves were read at 100 equally spaced points and then plotted to 1:1 scale, with $r_0=4.75$ in., and used to produce templates. The templates were used to machine the desired surfaces on the lathe. The finally machined surfaces were made accurate to within about 5 mils.

In the specific example, the radius of 4.75 inches was dictated by available construction facilities. In general, if the desired beam width is known, the required aperture is given by $$A = \frac{k \cdot x}{\text{Beam width}}$$

where $k$ is a factor depending on the illumination distribution from the primary feed, and where $x$ is the wavelength. Let $\Delta r_0$ be the radial thickness of the added lip, i. e., $\Delta r_0 = r_0 - \lambda r_0$. Then the overall diameter of the system is $A + 2\Delta r_0 = 2r_0$. Also $A = 2\lambda r_0$. Then $\lambda$ is approximately $$\left(1 - \frac{\Delta r_0}{r_0}\right)$$

Consequently, for a desired aperture A, first select $\Delta r_0$ at a convenient value, such that serious reflections may be avoided. A value between one and two wavelengths is recommended. The value $r_0$ is then fixed by the equation $A + 2\Delta r_0 = 2r_0$. The parameter $\lambda$ is fixed by $A = 2\lambda r_0$. It is apparent that for the specific example the aperture A is about 8.6 cm., or very nearly 24 wavelengths.

Modifications (Figs. 8–11)

Where the horn, such as terminates the waveguide feed 14 of Fig. 1, provides an apparent point source substantially displaced from the circular aperture of the antenna 8, the equations should be modified. Suppose the focus to be at a point $O'$ at radius $r'_0$ where $r'_0$ is greater than $r_0$. Then one should employ the equation $$\int_{r_0}^{r'_0} \frac{h\,dr}{r(r^2 - h^2)^{1/2}} + 2\int_{\lambda r_0}^{r_0} \frac{h(1+y'^2)^{1/2}dr}{r(r^2 - h^2)^{1/2}} + 2\int_{h}^{\lambda r_0} \frac{h(1+y'^2)^{1/2}dr}{r(r^2 - h^2)^{1/2}} = \pi/2 + \cos^{-1} h/r_0 \quad (33)$$

instead of Equation 11. $y$ between 0 and $\lambda r_0$ is determined to satisfy the equation for all values of $h$ between 0 and $\lambda r_0$. The first integral represents the polar angle traced by a ray in travelling from the apparent point of focus to the aperture circle along a surface where $y'=0$. The path length equation can be similarly modified. A method of solution similar to that used in the case of the complete surface of revolution means surface, as for Fig. 1, may be employed as will be apparent to those skilled in mathematics. This is simply equivalent to choosing for $y$ an arbitrary function having $y'=0$ in the interval $r'_0$ to $r_0$ and whatever is desired, as say the arc of a circle for the interval $r_0$ to $\lambda r_0$ as before.

Figure 9:
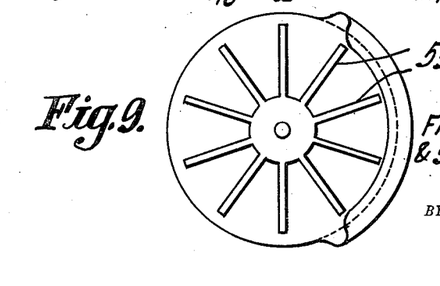

It is convenient, especially for multiple feed limited sector scanning, to arrange the plates and the entrance aperture so that the feed elements do not interfere with the exit aperture (or conversely for received radiations, so that the receiving horn elements will not interfere with the entrance aperture of the antenna). This may be accomplished by the device illustrated in Figs. 8 and 9. Here a lip portion 54 is folded under and extends $r = r_1$ in one angular region. The feed may be by the switch and rotating joint 40 (modified for the desired number of feed waveguides) to feed waveguides 55. Thus this lip portion has an entrance aperture facing the axis. A generating curve for this region folds back to join the domed portion 56 generating curve as an extension thereof. The entrance aperture is defined by the parallel metallic surfaces along the extremity of this extension at $r_1$. A further lip region 58 on the side diametrically opposite the axis serves as the exit aperture for radiation. The manner of calculating a mean surface which will focus all rays which pass into the dome portion 56 to meet these requirements is apparent from what has gone before. The requirement is:

$$h\int_{r_1}^{r_2}\frac{(1+y_1'^2)^{1/2}dr}{r(r^2-h^2)^{1/2}} + h\int_{\lambda r_0}^{r_2}\frac{(1+y_2'^2)^{1/2}dr}{r(r^2-h^2)^{1/2}} + 2h\int_{h}^{\lambda r_0}\frac{(1+y_3'^2)^{1/2}dr}{r(r^2-h^2)^{1/2}} + h\int_{\lambda r_0}^{r_3}\frac{(1+y_4'^2)^{1/2}dr}{r(r^2-h^2)^{1/2}} = \frac{\pi}{2} + \cos^{-1}\frac{h}{r_3} \quad (34)$$

for all $h$ less than $\lambda r_0$.

In this equation $y_1$, $y_2$ and $y_4$ are arbitrary predetermined functions which respectively conform to the desired generating curve for the entrance lip portion 54, the folded back portion 55 from the entrance lip portion 54 to the dome portion 56, and the exit lip portion 58. The radii $r_1$, $r_2$, and $r_3$ respectively are the radius to the entrance at the entrance lip portion 54, the maximum radius of the dome surface, and the maximum radius at which the exit lip portion terminates. The limit of integration $\lambda r_0$ is the maximum radius of the dome portion. In other words, the integration is extended over the predetermined functions $f_1(r)$, $f_2(r)$, and $f_4(r)$ which relate to the outer portions. The generating curve for the inner dome portion 56 is then determined to satisfy the equation for all $h$ less than $\lambda r_0$. In the embodiment just described one interesting feature is that if $r_1$ equals $\lambda r_0$ all radiation from the feed is collimated, because from Equation 1 for $r = r_1 = \lambda r_0$, $r_1 \sin \alpha_1 = \lambda r_0 \sin \alpha_1 = h$. Therefore, the maximum value of $h$ is $\lambda r_0$ corresponding to $\alpha_1 = 90°$. Therefore, assuming all radiation from the feed is forward so that $\alpha$ does not exceed 90°, all the rays are collimated since the focussing condition is met for all $h$ less than $\lambda r_0$.

The embodiment of Figs. 10 and 11 also is convenient for multiple feed limited sector scanning as the feed elements do not interfere with the exit aperture (for radiation purposes). The exit lip portion 58 may be as in Figs. 8 and 9. The entrance lip portion 60 is brought down to face axially. The energy is fed by a plurality of waveguides 55 having their terminations bent to direct the energy axially into the axially facing portion 60. The central completely rotationally symmetrical dome portion 56 (indicated in dotted lines in Fig. 11) is modified, of course, to satisfy the requisite equations for its mean surface, as explained heretofore. In short, the integral $$h\int\left|\frac{(1+y'^2)^{1/2}dr}{r(r^2-h^2)^{1/2}}\right|$$

is extended over the entire range of the generating curve. However, for the central portion 56, the integral may be reduced to $$2h\int_{0}^{\lambda r_0}\frac{(1+y'^2)^{1/2}dr}{r(r^2-h^2)^{1/2}}$$

The added integrals for the entire range of $r$ are then made equal to $\pi/2 + \cos^{-1} h/r_3$ where $r_3$ is the radius at the exit aperture, by determining $y(r)$ to satisfy the equality all $h$ in the central region between $h = \lambda r_0$ and $h = 0$.

If the index of refraction throughout the space between the plates is different from unity, by reason of the energy being polarized normally to the axis or by reason of a dielectric of index different from unity being used throughout the space between the plates, the extended integral must be made equal to $$\pi/2 + \cos^{-1}\frac{\mu h}{r}$$

where $\mu$ is the effective index of refraction between the plates. If $\mu$ is less than unity, the phase velocity being greater than in free space, which can be the case only for energy polarized with the electric vector normal to the axis, the resultant dome is found to be higher, and conversely if $\mu$ is greater than unity, the dome is less high, as pointed out hereinbefore.

It has been assumed that the dielectric ring 17, or spacers used, are substantially "invisible" to the radiation. If, however, there is one or more rings of dielectric which have an index of refraction enough different from the adjacent dielectric ring, the difference should be taken into consideration. For this purpose, the integration may be divided into intervals for each of which $\mu$ is a constant. The index for each ring may be identified by a subscript, 1 for the first, 2 for the second, etc., thereby generalizing.

Then we proceed to evaluate the following integral over the curve:

$$\int \left| \frac{\mu_h h (1+y'^2)^{1/2} dr}{r(\mu_i^2 r^2 - \mu_h^2 h^2)^{1/2}} \right|$$

where $\mu_h$ is the index of refraction at $h$, and $\mu_i$ is the index in the particular $i$th interval over which the integration is extended, evaluating first those outer portions where the curve $y(r)$ is a predetermined function of $r$, and adding an integral taken over the first outermost ring of the inner dome portion where the index of refraction is constant, and determining the function $y$ for that ring so that for all parameters $h$ of that ring, the sum equals $$\pi/2 + \cos^{-1} \frac{\mu_1 h}{r}$$

where $\mu_1$ is the index of refraction for that ring. Next, using the $y$ so determined for that ring, evaluate the same integral for all the predetermined portions and for the first ring portion, add the integral for the next or second ring portion, determining $y(r)$ for ring portion so that the sum gives $\pi/2 + \cos^{-1} \mu_2 h/r$ for all $h$ in the second ring and $\mu_2$ having then the value of the effective index of refraction for the second ring, and so on till all rings have been accounted for and the shape of the entire central dome portion determined.

*Summary*

The invention thus discloses a scan antenna of the parallel plate surface of rotation type. The plates or metallic bodies have parallel metallic surfaces between which the energy is guided. The central portion is dome shaped and is a complete surface of revolution of the curve $y(r)$ about the $y$ axis where $r$ is the radial distance from the axis. The central portion, or the curve $y(r)$, extends to some particular radius $\lambda r_0$. On one side of the axis, the rotational surface beyond the radius $r = \lambda r_0$, is a surface of revolution for at least a sector, generated by a predetermined function for the extension, and at the termination of the extension of $y(r)$ which generates the mean surface on this side, the tangent of $y(r)$ at its extremity is normal to the $y$ axis Thus an aperture is defined by the metallic bodies over the arc generated by this extremity which aperture faces away from and is coextensive with the arc generated by the said termination. On the opposite side of the axis from the first side, $y(r)$ has an extension or portion beyond $\lambda r_0$ which is also a predetermined function of $y(r)$. The second extension also generates, at least for a limited sector, a surface of revolution which is the mean surface between the metallic surfaces. However, this second predetermined extension may be different from the first, that is, $y(r)$ for this portion need not be the mirror image about the $y$ axis of the first extension. The termination of this second extension generates an arc over which the metallic surfaces define a second aperture. The second aperture may face away from the axis, toward the axis, or intermediate these, as axially. The function $y(r)$ for $r$ less than $\lambda r_0$ which generates the central dome portion is considered symmetrical (mirror-imaged) about the $y$ axis. This function is then uniquely determined to cause the integral $$\int \left| \frac{h(1+y'^2)^{1/2} dr}{r(r^2-h^2)^{1/2}} \right|$$

between the extreme values of $r$ for said second aperture or second extension of $y$ to $r_0$, the extreme value of $r$ for said first aperture or first extension of $y$, to be equal to $\pi/2 + \cos \mu_h/r_0$ for all values of $h$ for which $h$ is less than $|\lambda r_0|$. The parameter $h$ is always taken as positive. The two curve extensions may be mirror images of each other with respect to the $y$ axis, and the entire surface may be a complete surface of revolution. In this event, of course, the requirement that the first aperture face away from the axis is also true of the second aperture, which also faces away from the axis. The manner of determining the requisite mean surface where one or more rings of dielectric are included between the metallic surfaces coaxially with the axis of revolution has also been disclosed.

What is claimed is:

1. An antenna comprising a pair of metallic bodies having opposed parallel dielectrically separated surfaces, the median surface between said parallel surfaces being a surface of revolution generated by the curve $y=y(r)$ about the $y$ axis, $y$ and $r$ being rectangular coordinates, the curve $y(r)$ substantially conforming to an arbitrary function $y_1(r)$ in the interval between $r_0$ and $\lambda r_0$, where $r_0$ is the extreme radius of the generating curve remote from the axis, and $\lambda$ is a fraction between zero and unity, and the curve $y(r)$ for the remaining interval between $\lambda r_0$ and $0$ being determined as $y_2(r)$ substantially to satisfy the following equation:

$$2 \int_{h r_0}^{r_0} \frac{\mu_h h f(r) dr}{r(\mu_i^2 r^2 - h^2)^{1/2}} = \frac{\pi}{2} + \cos^{-1} \mu_h h$$

for all $h$ between $h=0$ and $h=\lambda$, in which equation $$f(r) = (1+y'^2)^{1/2}$$

and $$y' = \frac{d}{dr}(y(r))$$

the arbitrary function $y_1(r)$ being selected among the class of functions for which $y_1'(r) = 0$ at $r=r_0$, and having a continuous or step-wise discontinuous derivative $y_1'(r)$ throughout its range, $\mu_h$ is the value of $\mu_i$ at radius $h$, and where $\mu_i$ is the index of refraction for electromagnetic waves at a predetermined operating frequency in the $i$th interval of integration.

2. The antenna claimed in claim 1, the function $y_1(r)$ being substantially of the form:

$$y_1(r) = [c^2 - (r_0 - r)^2]^{1/2}$$

where $c$ is a constant.

3. The antenna claimed in claim 1, the function $y_1(r)$ in the interval between $r_0$ and $\lambda r_0$ being determined as follows:

$$f(r) = 1 + \frac{1}{2}\left(\frac{r_0-r}{c}\right)^2 + \frac{3}{8}\left(\frac{r_0-r}{c}\right)^4 = \{1+[y_1'(r)]^2\}^{1/2}$$

where $c$ is a constant.

4. The antenna claimed in claim 1, the function $y_1(r)$ being determined as follows:

$$f(r) = (1+y_1'^2)^{1/2} = \left[1-\left(\frac{r_0-r}{c}\right)^2\right]^{-1/2}$$

where $c$ is a constant.

5. The antenna claimed in claim 1, the fraction $\lambda$ being greater than 0.85.

6. The antenna claimed in claim 1, the fraction $\lambda$ lying between 0.95 and 0.85.

7. The antenna claimed in claim 1, the fraction $\lambda$ being substantially equal to 0.9.

8. An antenna comprising a pair of metallic bodies having opposed parallel dielectrically separated surfaces, the median surfaces between said parallel surfaces being a surface of revolution generated by a curve about the axis, a portion of the curve remote from the axis forming a lip portion, of arbitrary shape, the remaining inner portion of the curve being calculated to cause the geodesics on the median surface from the periphery of said lip portion which reach said inner portion to be focussed, the tangent to said curve at its outer periphery being inclined at an angle to said axis of revolution.

9. The antenna claimed in claim 8, said inner portion having a radius at least 0.85 of the entire radius.

10. A plurality of antennas as claimed in claim 1, arranged with the axis of each aligned with that of the others, and each antenna spaced equally from the next adjacent one.

11. The antenna claimed in claim 1, the index of refraction, being taken as unity throughout for all values of $r$.

12. The antenna claimed in claim 11, and further comprising one and only one antenna element having an energy pattern directed between said parallel surfaces and with an axis intersecting the said axis of rotation, said antenna element being rotatable about said axis.

13. An antenna as claimed in claim 1, further comprising a plurality of antenna elements each having an energy pattern directed between said parallel surfaces and each said pattern with an axis intersecting the said axis of rotation said elements being rotatable about said axis as their axis of rotation.

14. An antenna as claimed in claim 13, said elements being equally spaced angularly about said axis of rotation.

15. An antenna comprising a pair of metallic bodies having parallel dielectrically separated surfaces, the median surface between said parallel surfaces having a central dome portion which is a complete surface of revolution about the $y$ axis of a curve $y(r)$ a function of $r$ for $|r| < \lambda r_0$, where $r$ is the radial distance from said axis, so that $y(r)$ and $r$ are rectangular coordinates, and $\lambda r_0$ is a specified value of $r$ less than $r_0$; and for at least a limited sector, the said median surface is the surface of revolution of an extension of the curve $y(r)$ beyond $|r| = \lambda r_0$ on one side of said axis, said extension being a predetermined function of $y(r)$ with a tangent normal to said axis at $r_0$ the extension extremity remote from said axis, the metallic surfaces defining over the arc generated by said extremity a corresponding first aperture facing away from said axis which first aperture is an exit aperture for energy radiated from the antenna and an entrance aperture for energy received by the antenna; and on the side of said axis opposite the first section and first aperture, the said median surface is a surface of revolution of a second predetermined extension of the curve $y(r)$, the metallic surfaces defining over the arc generated by the extremity of said second extension remote from said axis a corresponding second aperture which second aperture is the entrance aperture for energy to be radiated and the exit aperture for energy to be received, the said function $y(r)$ being determined to collimate those energy rays passing between said plates from said second aperture which pass through any part of said central portion, whereby the greater portion of energy directed to enter said second aperture is collimated at said first aperture, and collimated energy entering said first aperture is brought substantially to a point focus at said second aperture.

16. An antenna comprising a pair of metallic bodies having parallel dielectrically separated surfaces, the median surface between said parallel surfaces having a central dome portion which is a complete surface of revolution about the $y$ axis of a curve $y(r)$ a function of $r$, for $|r| < \lambda r_0$, where $r$ is the radial distance from said axis, so that $y(r)$ and $r$ are rectangular coordinates and $\lambda r_0$ is a specified value of $r$ less than $r_0$; and for at least a limited sector, the said median surface including the surface of revolution of an extension of the curve $y(r)$ beyond $|r| = \lambda r_0$ on one side of said axis, said extension being a predetermined function with a tangent normal to said axis at the extension extremity remote from said axis, the metallic surfaces defining over the arc generated by said extremity a corresponding first aperture facing away from said axis, and on the side of said axis opposite the first sector and first aperture, the said median surface is a surface of revolution of a second predetermined extension of the curve $y(r)$, the metallic surfaces defining over the arc generated by the extremity of said second extension remote from said axis a corresponding second aperture, which second aperture is the entrance aperture for energy to be radiated and the exit aperture for energy to be received, the said function $y(r)$ being determined so that $$\int \frac{\mu_h h(1+y'^2)^{1/2} dr}{r(\mu_i^2 r^2 - \mu_h^2 h^2)^{1/2}} = \frac{\pi}{2} + \cos^{-1} \frac{\mu_h h}{r_0}$$

for the integral evaluated over the entire surface from the extreme value of $r$ for said second aperture to $r_0$, the extreme value of $r$ for said first aperture for any and all values of $h$ for which $|h| < \lambda r_0$, where $\mu_h$ is the particular effective index of refraction at any radius $r = h$, and $\mu_i$ is the effective index of refraction over the $i$th interval of integration.

17. The antenna claimed in claim 16, the said index of refraction being everywhere taken as unity.

18. The antenna claimed in claim 16, the said second aperture facing away from said axis.

19. The antenna claimed in claim 16, the said antenna having in the interval between a single pair of radii, an index of refraction constant in that interval and different from unity, and having elsewhere an index of refraction of unity.

20. The antenna claimed in claim 16, the said curve $y(r)$ being on one side of the $y$ axis, including both said extensions, a mirror image of the said curve on the other side.

21. The antenna claimed in claim 20, the said mean surface being entirely a complete surface of revolution.

22. A plurality of antennas as claimed in claim 16, coaxial with each other, and axially spaced.

23. The antenna claimed in claim 1, the fraction $\lambda$ having approximately the value $$1 - \frac{\Delta r_0}{r_0}$$

where $\Delta r_0$ is between about one and two wavelengths at the operating frequency.

24. The antenna claimed in claim 8, the difference in outer and inner peripheral radii of the said outer portion being between one and two wavelengths at a predetermined operating frequency.

References Cited in the file of this patent

UNITED STATES PATENTS

| | | |
|---|---|---|
| 2,576,182 | Wilkinson | Nov. 27, 1951 |
| 2,625,679 | Iams | Jan. 13, 1953 |
| 2,653,239 | Chu | Sept. 22, 1953 |